(12) United States Patent
Pallini, Jr. et al.

(10) Patent No.: US 7,963,337 B2
(45) Date of Patent: Jun. 21, 2011

(54) COMPOSITE ENHANCED METALLIC DRILLING RISER SYSTEM

(75) Inventors: Joseph W. Pallini, Jr., Tomball, TX (US); Frank C. Adamek, Pasadena, TX (US); Karl A. Parfrey, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 385 days.

(21) Appl. No.: 12/187,831

(22) Filed: Aug. 7, 2008

(65) Prior Publication Data
US 2010/0032214 A1    Feb. 11, 2010

(51) Int. Cl.
*E21B 17/01* (2006.01)
(52) U.S. Cl. .................................. 166/367; 405/195.1
(58) Field of Classification Search .................. 166/367; 405/195.1
See application file for complete search history.

(56) References Cited

U.S. PATENT DOCUMENTS

| | | | | |
|---|---|---|---|---|
| 3,768,842 A | * | 10/1973 | Ahlstone | 285/55 |
| 4,185,856 A | * | 1/1980 | McCaskill | 285/18 |
| 4,634,314 A | * | 1/1987 | Pierce | 405/224.2 |
| 5,439,323 A | | 8/1995 | Nance | |
| 5,771,975 A | | 6/1998 | Anderson et al. | |
| 5,813,467 A | | 9/1998 | Anderson et al. | |
| 2001/0045286 A1 | * | 11/2001 | Pallini et al. | 166/345 |

* cited by examiner

*Primary Examiner* — Hoang Dang
(74) *Attorney, Agent, or Firm* — Bracewell & Giuliani

(57) ABSTRACT

An offshore composite enhanced metallic drilling riser is equipped to enable preloading of the composite shell and the metallic riser. A riser has steel end connectors and a continuous metallic inner liner, encased in a composite shell. A segmented hyperboloid shaped profile is located near each of the end fittings for preloading of the composite and the metallic riser. In one version, both halves of the hyperboloid shape are capable of axial movement by adjusting jack bolts connected to one of the hyperboloid halves. One of the halves is limited in axial movement while the other half moves axially away from the restricted half, the movement simultaneously generates the composite pre-load and the metallic riser pre-load. The other version uses fluid pressure between mating faces of the segments to push them apart.

20 Claims, 4 Drawing Sheets

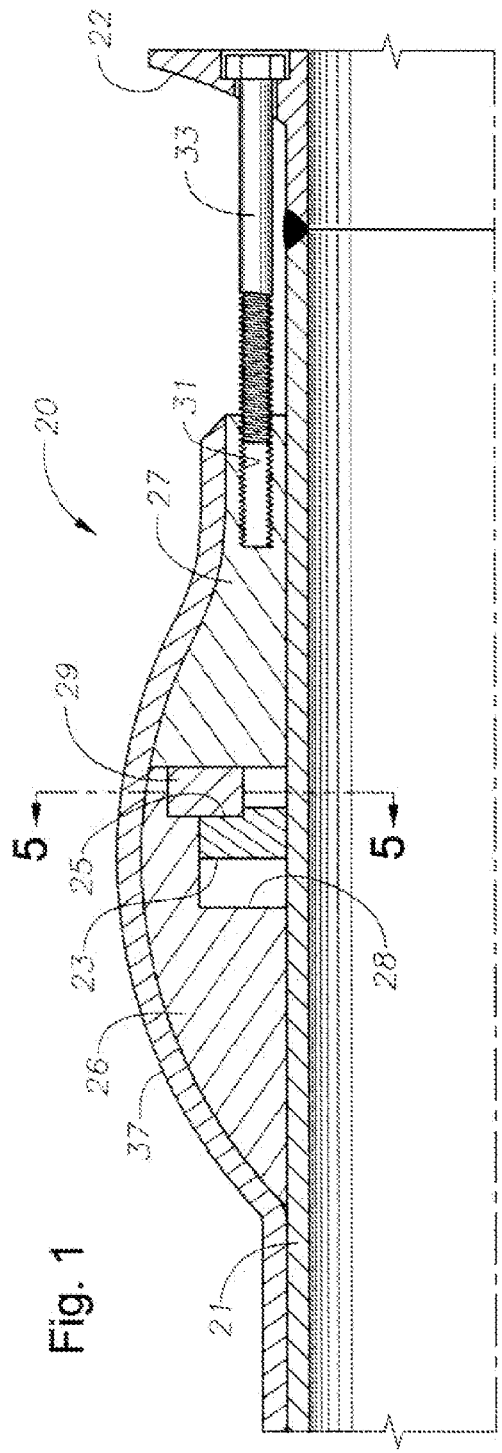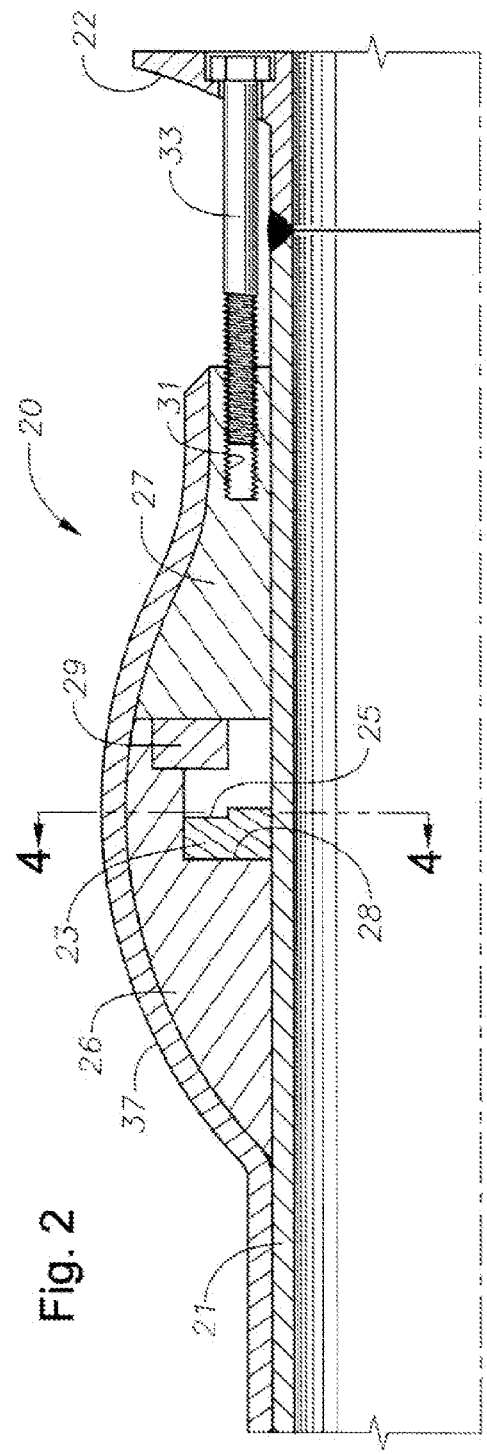

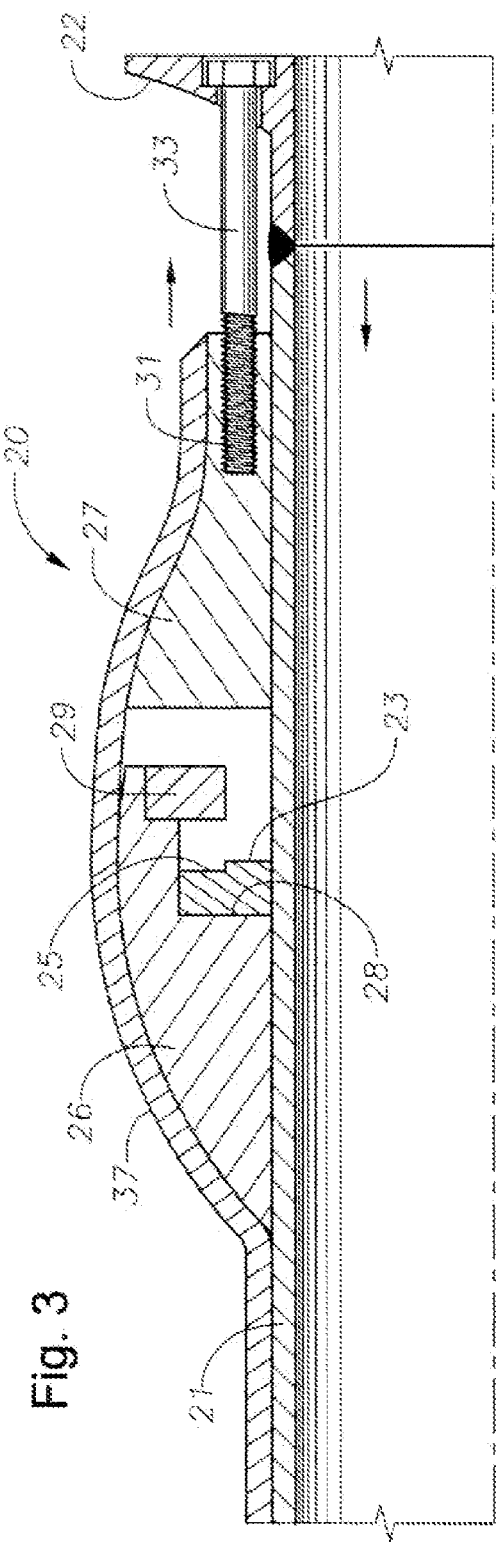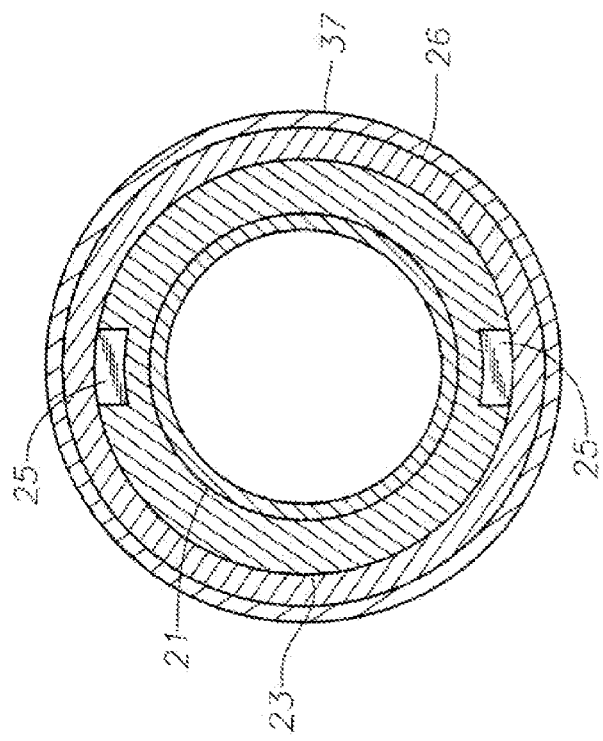

COMPOSITE ENHANCED METALLIC DRILLING RISER SYSTEM

FIELD OF THE INVENTION

This invention relates in general to offshore drilling, and in particular to a method and apparatus for preloading a composite enhanced metallic drilling riser assembly.

BACKGROUND OF THE INVENTION

As floating production platforms are moving to deeper waters, lower weight drilling risers are required. A drilling riser is a large diameter string of pipe made up of sections that are secured together, typically by flanged connections. Metallic drilling and productions risers need to be 30% to 50% lighter than metallic risers used in standard depth platforms. A composite overwrap on a metallic tubular improves the hoop characteristics and allows the riser weight to be reduced by approximately 30%. However, a further reduction to 50% requires a unique method to not only support the hoop loading, but also to carry a larger portion of the axial loading. Problems exist in transferring axial loading from the metallic tubular to the composite in a composite enhanced metallic drilling riser system.

SUMMARY OF THE INVENTION

In view of the foregoing, embodiments of the present invention beneficially provide an offshore composite enhanced metallic drilling riser equipped to enable preloading of the composite shell and the metallic cylinder. The composite enhanced metallic drilling riser system as comprised by the present invention comprises steel end connectors and a continuous metallic cylinder, encased in a composite shell. A segmented hyperboloid shaped profile is located near each of the end fittings for preloading of the composite and the metallic riser. A ring is mounted to the metallic cylinder between the halves of the hyperboloid. Both halves of the hyperboloid shape are capable of axial movement by adjusting jack bolts connected to one of the hyperboloid halves. The other end of the jack bolts are secured to connector flanges on the metallic cylinder. One of the halves is limited in axial movement by the ring surrounding the metallic cylinder. As the other hyperboloid half moves axially away from the restricted half, the movement simultaneously generates the composite pre-load and the metallic cylinder pre-load.

Embodiments of the present invention also provide an alternate embodiment segmented hyperboloid shaped profile located near each of the end fittings for preloading of the composite and the metallic cylinder. In one embodiment, one half of the hyperboloid shape is moved axially to generate the composite pre-load. Pressure is introduced by a radial port between the metallic cylinder and the composite and enters at the vertical plane of the two hyperboloid halves, to drive the two axially apart. A ratcheting thread is located on the horizontal interface between the hyperboloid half and the metallic cylinder, to maintain the axial position of the hyperboloidal profile while pre-loading the composite. An inwardly biased "C-ring" is located at the vertical plane of the two hyperboloids, and moves radially into the axial gap created between the hyperboloid halves. The width of the "C-ring" allows the calculated pre-load to be maintained, prohibiting the hyperboloid halves from moving closer to one another.

In view of the foregoing, the present invention provides an apparatus and method which utilizes the movement of hyperboloid shaped halves in order to provide a reliable method of pre-loading the composite material and the cylinder.

BRIEF DESCRIPTION OF THE DRAWINGS

FIG. 1 is a sectional view of a composite enhanced drilling riser assembly constructed in accordance with this invention.

FIG. 2 is a sectional view of the composite enhanced drilling riser assembly of FIG. 1, during a first portion of a process for preloading the composite enhanced drilling riser assembly.

FIG. 3 is a sectional view of the composite enhanced drilling riser assembly of FIG. 1, after the process of preloading the composite enhanced drilling riser is completed.

FIG. 4 is a sectional view of the ring attachment taken along the line 4-4 of FIG. 2.

DETAILED DESCRIPTION OF THE INVENTION

Figure 5:
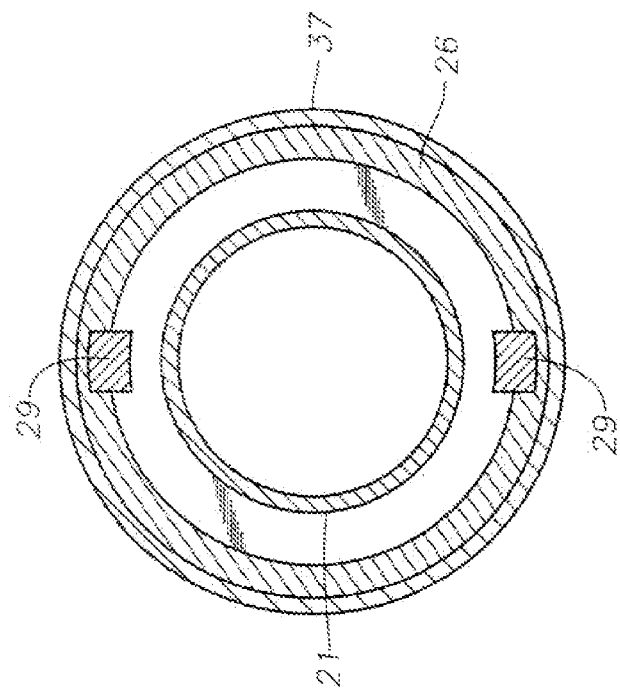
FIG. 5 is a sectional view of the inner tail piece taken along the line 5-5 of FIG. 1.

Referring to FIG. 1, a drilling riser assembly, represented generally by reference numeral 20, is presented. The drilling riser assembly comprises a metallic cylinder 21 made up of sections of riser pipe secured together. In this embodiment, the various pipe sections are secured together by flanges 22 and bolts (not shown), but other means are feasible, such as by radially moving dogs. Flange sections 22 are welded onto each end of metallic cylinders 21.

A ring 23 is placed around and welded to metallic riser 21. Ring 23 contains a set of milled slots 25 in its outboard face (FIG. 4). Two segments, inner tail piece 26 and outer tail piece 27, form a hyperboloid shaped profile when positioned together around metallic cylinder 21. Inner tail piece 26 is machined with a shoulder 28 on its interior surface, allowing it to pass over and move relative to ring 23. Tabs 29 are securely attached to inner tail piece 26 and align with milled slots 25 on ring 23 (FIG. 5). Milled slots 25 and matching tabs 29 ensure that inner tail piece 26 does not rotate about the axis of metallic cylinder 21.

Ring 23 is captured between inner tail piece 26 and tabs 29. The axial movement of inner tail piece 26 is limited in range by shoulder 28 and tabs 29. Outer tail piece 27 is placed around metallic cylinder 21 and positioned in abutment with inner tail piece 26 and tabs 29, forming a hyperboloid shaped profile. The end of outer tail piece 27 closest connector flange 22 is machined with a plurality of threaded holes 31 capable of receiving jack bolts 33. Jack bolts 33 extend through apertures on flange 22 and screw into threaded holes 31 on outer tail piece 27. Once ring 23, inner tail piece 26, and outer tail piece 27 are assembled on cylinder 21, a mold release agent is placed over these components, ensuring that the composite layer 37 does not bond to the components during the application process.

A composite layer 37 is then formed over the metallic riser 21, inner tail piece 26, and outer tail piece 27. The composite fabrication process may be accomplished by a variety of processes including, for example, filament winding, tape laying, roll wrapping, and hand layup. Once the composite has cured, the assembly is ready to be preloaded.

Referring generally to FIGS. 1-3, the riser assembly 20 comprises a preloading system that is adapted to apply a tensile load to the composite layer 37 and apply a compressive load to the cylinder 21. As jack bolts 33 are tightened, outer tail piece 27 is moved axially toward flange 22. As outer tail piece 27 moves closer to flange 22, the movement simultaneously causes composite layer 37 to move axially toward flange 22. As outer tail piece 27, and composite layer 37 move, inner tail piece 26 also moves closer toward flange 22, while ring 23 remains fixed to cylinder 21. The axial movement of the composite layer 37 with respect to cylinder 21 results in a tension preload in composite layer 37 which is balanced by a compression preload in cylinder 21 (FIG. 3), as represented by arrows. The preload of the composite 37 against cylinder 21 relieves cylinder 21 of some portion of the externally applied tensile load borne by the riser joint assembly 20 when it is placed in service within a riser string. The riser assembly 20 allows the apportionment of the applied load carried between the cylinder 21 and the composite 37 to be controlled and optimized.

Inner tail piece 26 is able to move axially toward flange 22, but is limited in range by shoulder 28 contacting ring 23. When shoulder 28 comes into contact with ring 23, inner tail piece 26 can no longer move axially. As illustrated by FIG. 3, jack bolts 33 may be turned even further, resulting in increased axial movement of outer tail piece 27, and an increased distance between inner tail piece 26 and outer tail piece 27. The movement forces inner tail piece 26 and outer tail piece 27 into greater contact with the inner surfaces of layer 37, increasing pre-loading of the composite to metal joint.

The axial movement of outer tail piece 27 away from inner tail piece 26 increases the contact pressure between tail pieces 26, 27 and composite 37. This increased contact pressure creates an internal preload between metallic components 26, 27 and composite 37 of the composite to metallic interface. The preload prevents looseness or relative motion between composite 37 and components 26, 27, increasing fatigue performance.

As outer tail piece 27 moves closer to flange 22, the movement simultaneously causes composite layer 37 to move, placing the composite structure in increased tension. As composite layer 37 is placed in increased tension, metallic cylinder 21 is placed in increased compression. The result is simultaneous pre-loading of composite structure 37 and metallic cylinder 21. The end of cylinder 21 opposite the end shown may have a similar arrangement to apply tension and enhance bonding of composite layer 37.

Figure 6:
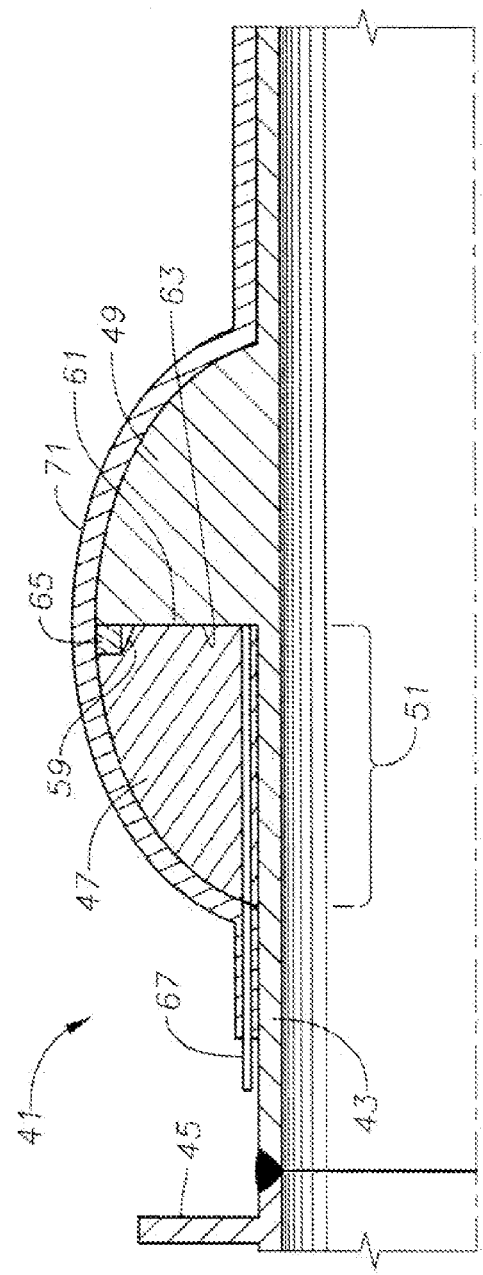
FIG. 6 is a sectional view of a composite enhanced drilling riser assembly constructed in accordance with an alternate embodiment of this invention.
Figure 7:
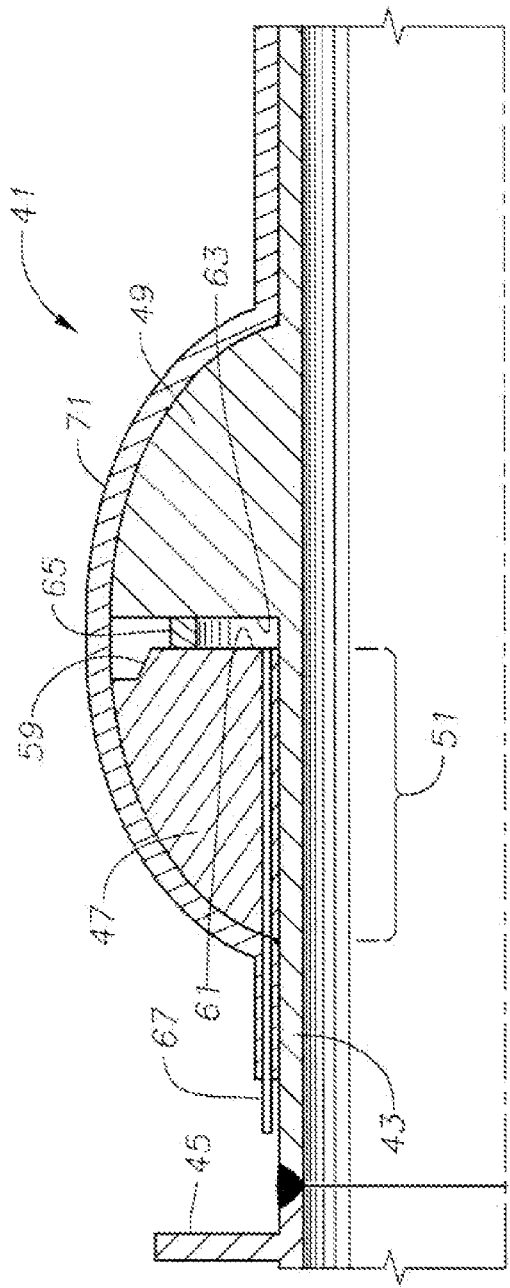
FIG. 7 is a schematic sectional view of the composite enhanced drilling riser assembly of FIG. 6 after preloading.
Figure 8:
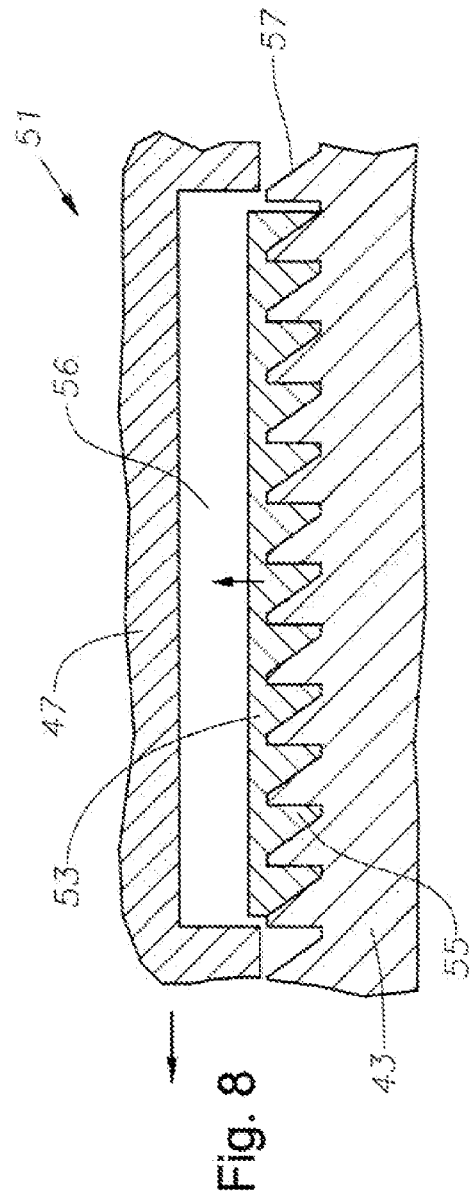
FIG. 8 is an enlarged sectional view of the threaded interface of the composite enhanced drilling riser assembly of FIGS. 6 and 7.

Referring generally to FIGS. 6-8, an alternate embodiment of a drilling riser is presented. Referring to FIG. 6, the riser assembly 41 includes a metallic cylinder 43 made up of sections of riser pipe secured together. In this embodiment, the various pipe sections are secured together by flanges 45 and bolts (not shown). Flange sections 45 are welded onto each end of metallic cylinders 43. Floating segment 47 and fixed segment 49 form a hyperboloid shaped profile when positioned together around metallic cylinder 43. Segment 49 is shaped as half of a hyperboloid, and is fixed to cylinder 43; segment 49 may be formed integrally as part of cylinder 43. Segment 47, the other half of the hyperboloid, is connected to the metallic cylinder 43 by way of a ratchet interface arrangement 51. The two segments 47, 49 are positioned in abutment with one another to form a hyperboloid shaped profile near the end segments of each cylinder 43.

Referring to FIG. 8, ratchet interface 51 may include a split ring 53 with external teeth 55. Split ring 53 is carried in a recess 56 of segment 47. Split ring 53 is biased inward into engagement with thread or grooves 57 formed on the exterior of cylinder 43. Teeth 55 are saw-toothed in shape. As segment 47 moves in the direction of the arrow, ring 53 expands and contracts, with teeth 55 moving over grooves 57.

An angled shoulder 59 is located on the outer diameter of face 61 of segment 47. Face 61 is perpendicular to the axis of cylinder 43 and initially abuts a similar face 63 on segment 49. An inwardly biased C-ring 65, of a predetermined width is held in shoulder 59. An access port 67 is located radially outwards from cylinder 43, extends axially along the length of cylinder 43, passes through segment 47, and ends at the abutting faces 61, 63 of the two hyperboloid halves 47, 49.

A mold release agent is placed over the riser 43, segments 47, 49, C-ring 65, and port 67, ensuring that the composite material does not bond to these components during the application process. A composite layer 71 is then formed over the metallic riser 43 and the hyperboloid shaped profile. The composite fabrication process may be accomplished by a variety of processes including, for example, filament winding, tape laying, roll wrapping, and hand layup. Once the composite has cured, the assembly is ready to be preloaded.

As illustrated by FIG. 7, air or another fluid is introduced through pressure port 67, and enters between faces 61, 63 of the two hyperboloid halves 47, 49, driving the two axially apart as pressure increases. Ratcheting thread arrangement 51 maintains the axial position of the hyperboloidal profile 47 while pre-loading the composite 71. As pressure is supplied to port 67, the pressure build up between faces 61, 63 of segments 47, 49 causes segment 47 to move away from segment 49 and toward flange 45. Inwardly biased C-ring 65 slides on tapered shoulder 59 and moves radially into the axial gap created between the faces 61, 63 of hyperboloid halves 47, 49. The width of C-ring 65 allows the calculated pre-load to be maintained, prohibiting the hyperboloid halves 47, 49 from moving closer to one another. As segment 47 moves axially, composite layer 71 is placed in tension. The movement of segment 47 also causes pre-loading of the composite to metal joint due to the increased contact between the composite layer 71 and segments 47, 49.

Alternatively, the positions of segments 47, 49 could be switched so that segment 49 move axially away from flange 45. This arrangement would provide a means for pre-loading the composite to metal joint. However, the arrangement would not place the entire composite structure 71 in tension as the previous arrangement.

While the invention has been shown in only two of its forms, it should be apparent to those skilled in the art that it is not so limited but susceptible to various changes without departing from the scope of the invention.

The invention claimed is:

1. A composite enhanced metallic drilling pipe comprising:
    a hollow cylinder, comprising a metal, having a central longitudinal axis;
    a sleeve, comprising a composite material, disposed over at least a portion of the hollow cylinder; and
    a preloading mechanism, comprising a first segment and a second segment, the second segment being axially movable relative to the cylinder, wherein the preloading mechanism is adapted to enable the second segment to be moved axially relative to the cylinder to apply a tensile force to the sleeve and a compressive force to the hollow cylinder.

2. The pipe of claim 1 wherein each of the segments is mounted on an outer diameter portion of the cylinder.

3. The pipe of claim 1 wherein:
the pipe has a flange section extending axially from the cylinder; and
the second segment is connected to the flange section by an adjustable bolt that extends from the flange section to the second segment for axially moving the second segment.

4. The pipe of claim 1 wherein the first segment is rigidly connected to the cylinder.

5. The pipe of claim 1 wherein the pretension mechanism comprises a ratcheting interface between the second segment and the cylinder so as to allow axial movement of the second segment in one direction, but prevent axial movement in the opposite direction.

6. The pipe of claim 1 wherein the second segment is capable of moving axially relative to the first segment from an initial position wherein the pretension mechanism further comprises a spacing member, positioned between the first and second segments while at a desired spacing between each others to maintain said desired spacing.

7. The pipe of claim 1 wherein the segments have an exterior contour that is hyperboloidal.

8. The pipe of claim 1 wherein each of the segments is capable of axial movement relative to the cylinder, but the second segment is capable of greater axial movement relative to the cylinder than the first segment.

9. The pipe of claim 1 wherein the pretension mechanism comprises a fluid conduit to introduce fluid pressure to drive the second segment apart from the first segment.

10. A composite enhanced metallic pipe comprising:
a hollow metallic cylinder extending along a central longitudinal axis;
first and second segments disposed around the cylinder and defining a selected contour, the segments being axially moveable relative to the cylinder;
a sleeve of composite material formed about the cylinder and over the contour of the segments;
a flange section extending axially from an end of the cylinder, the second segment being closer to the flange than the first segment;
a restrictive member, securely joined to the cylinder between the first and second segments for limiting the axial movement of the first segment to a selected distance; and
an adjustable link extending from the second segment to the flange such that adjustment of the link moves the second segment axially, applying tension to the sleeve and bringing along with it the first segment until the first segment contacts the restrictive member, wherein continued adjustment of the link causes the second segment to move axially apart from the first segment.

11. The pipe of claim 10 wherein the contour is hyperboloidal.

12. The pipe of claim 10 further comprising anti-rotation tabs (29) located on the first segment for engagement with anti-rotation slots (25) on the restrictive member, restricting the rotation of the first segment about the cylinder.

13. A composite enhanced metallic pipe comprising:
a hollow metallic cylinder extending along a central longitudinal axis;
first and second segments disposed around the cylinder and defining a selected contour, the first segment rigidly connected to the cylinder, the second segment capable of axial movement, wherein the segments have mating faces in an initial position; and
a fluid passage to deliver fluid pressure and force to move the second segment axially away from the first segment.

14. The pipe of claim 13 further comprising an inwardly biased split ring carried in a recess in one of the faces that moves between the faces to hold apart the first and second segments.

15. A method for preloading a composite enhanced metallic pipe comprising:
forming an axially moveable connection assembly with first and second juxtaposed segments on an end portion of a metallic cylinder;
connecting a flange section to the end of the cylinder;
forming a composite sleeve over the cylinder and the juxtaposed segments; and
moving the second segment axially toward the flange section relative to the cylinder, applying tension to the sleeve and compression to the metallic cylinder.

16. The method of claim 15 further comprising:
moving the first segment with the second segment toward the flange section for a limited distance; then
continuing to move the second segment toward the flange section while the first segment remains stationary relative to the cylinder.

17. The method of claim 15 wherein moving the second segment comprises attaching the second segment to the flange with a threaded link and adjusting the link.

18. The method of claim 15 wherein the first segment is fixed to the cylinder and moving the second segment comprises:
applying fluid pressure between mating faces of the segments.

19. The method of claim 15 further comprising connecting a ratchet interface between the second segment and the cylinder that allows movement of the second segment toward the flange, but not away.

20. The method of claim 15 further comprising placing a spacer between the mating faces at the desired tension.

* * * * *